Oct. 27, 1936.   W. J. LEE   2,058,805
APPARATUS FOR DEMONSTRATING NONSKID PROPERTIES OF RUBBER TIRES
Filed Aug. 26, 1933
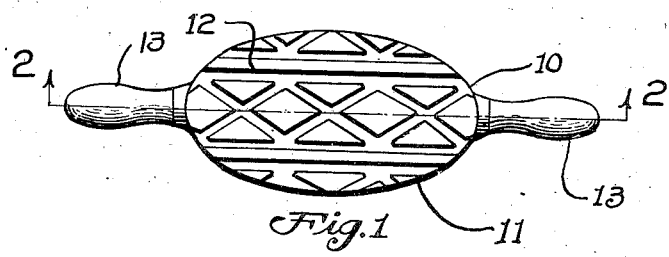
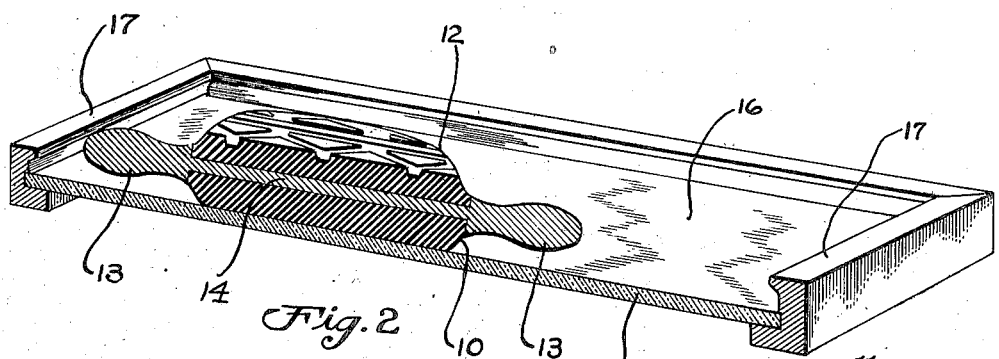
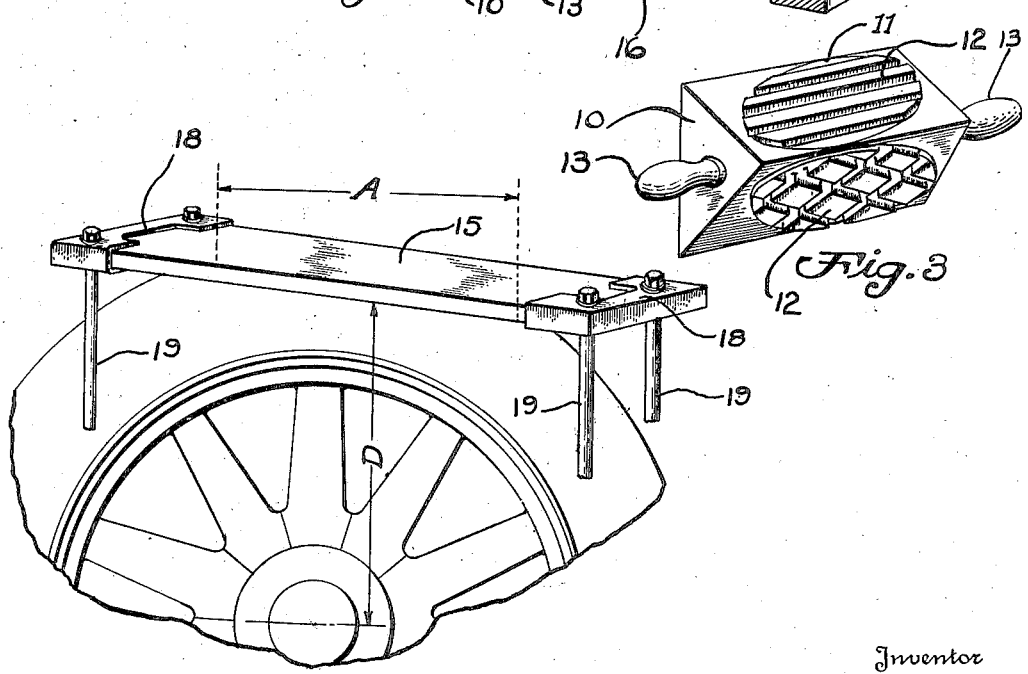
Inventor
Walter J. Lee Patented Oct. 27, 1936

2,058,805

UNITED STATES PATENT OFFICE 2,058,805

APPARATUS FOR DEMONSTRATING NON-SKID PROPERTIES OF RUBBER TIRES

Walter J. Lee, Cuyahoga Falls, Ohio, assignor to Wingfoot Corporation, Wilmington, Del., a corporation of Delaware Application August 26, 1933, Serial No. 686,871

2 Claims. (Cl. 35—50)

My invention pertains to an apparatus for demonstrating resistance to surface skidding of different bodies of like contact area and material but of different surface configuration when manually manipulated under identical conditions.

While the invention may be practiced on various substances representing various articles of mechanical utility within the scope of this invention, I have selected for disclosure a preferred embodiment as related to the demonstration of non-skid properties of rubber tires, preferably conventional pneumatic vehicle tires, whereby an interested party may manually demonstrate to his own satisfaction the relative advantages of tread surface configurations of various types as directly affecting the vital property of safety from skidding.

In recognition of the difficulty attending any attempt to demonstrate to an interested party the relative values of different non-skid tire tread designs by actual car-driving tests—which calls for very complete and scientific equipment not available to tire dealers—it has become the chief object of this invention to make available for general public use a simple, inexpensive and reliable means whereby the layman may determine with accuracy by his personal manipulation of the test device the effectiveness against the dangerous skid evil of certain mechanical tread design features.

Another object of the invention is to so design and proportion the test apparatus that the results attained by manual manipulation will accurately simulate the performance of actual tires on vehicles when subjected to conditions of skid hazard, said relative performance of test apparatus with tires in service being related to the identity of the design of the tread under investigation.

These and other objects will be more particularly developed throughout the following discussion, and illustrated by the drawing which discloses an actual and successfully practiced preferred application of the invention, but without limitation to the many modifications and variations of adaptation to which the invention may be applied within the scope thereof.

Figure 1 is a top view of a test block showing the design of a nationally known automobile tire tread duplicating in its area and proportion the actual flat foot-print of such tire when deflected by normal loading, it being understood that other surfaces of the test block not shown bear other tread designs, or are smooth, and that such other surfaces are of identical or substantially identical area and contour.

Figure 2 is a longitudinal sectional elevation on the line 2—2 of Figure 1, combined with a partial sectional view of a testing surface upon which the test is to be made, showing mode of operation.

Figure 3 is another form of the test block illustrating a polygonal structure, for example triangular, upon the several plain faces of which are duplicated various forms of tire design footprints, all identical or substantially identical as to inscribed area and contour, but of different design.

Figure 4 is a diagrammatic view of an actual tire deflected to normal loading by pressure applied on a heavy slab of clear plate glass through which the actual foot-print zone may be viewed and copied for preparing a test block design.

Referring particularly to the drawing, Figure 1 shows a test block 10 having an inscribed area contour 11 duplicating the actual foot-print of a selected size of pneumatic tire, normally loaded. All tread design surfaces on the block are generally indicated as 12, it being understood that each such design surface is different in configuration. For purposes of manual manipulation hand grasps 13 may be added and, as the maintenance of the block in a true plane of contact with the testing surface is desired during manipulation, it is proposed to add rigid internal supports 14 within the block and connected to the grasps. When desired to provide a plurality of designs on one block the type shown in Figure 3 may be advantageously used.

It is recognized that, in general, standard makes of tires of the same rated size and ply construction will, under similar normal loads, virtually coincide as to inscribed area and contour of foot-print, and that for the purposes of practicing this novel manual test such minor variations as may be found to exist can be safely ignored without adversely affecting the comparative results. In recognition of the above facts, the method and apparatus used for duplicating any desired tire foot-print for a test block face may be used to secure consistent results, as shown in Figure 4.

It being known that a properly inflated tire will deflect under normal load to a predetermined dimension "D", from axle to ground, the visual aspect of the foot-print, its actual area and contour, and the behavior of the particular tread design under load distortion may all be had by causing suitable downward pressure to be applied to a stout clear plate glass slab 15 until the deflection reaches known dimension D. At this point the glass may be suitably secured and the characteristics of the foot-print accurately ascertained and transferred by suitable procedure to the designing of a counterpart area 12 onto a face of the test block 10. It has been found that a metal reinforce 18 may be associated with the glass 15 and draw-bolts 19 provided to pull the desired deflection, and it will be observed that the long dimension A of the foot-print parallels the medial plane of the tire.

The visual foot-print of the actual deflected tire may be duplicated on a face of the block 10 either by causing a special mold to be prepared to such aspect, or by cutting the design into the block. Where a considerable number of test blocks are to be made it is, of course, advantageous to resort to molding. The method of duplicating the foot-print onto the block is not to be confined to the glass procedure. It is feasible to take a "smudge" print, by known methods, of the loaded tire and work from that to a mold or direct cutting of the block. A plastic impression may be taken of the loaded foot-print, suitable matrix prepared therefrom, and subsequent molding proceeded with to produce duplicated test block faces, all in accordance with known procedure.

The phenomenon of skidding of an automobile tire on smooth, wet road surfaces is too well known to require discussion. In order, however, to relate the present invention and its method of demonstration to actual motoring experience, it is appropriate to recall that the most easily analyzed skid situation occurs when driving on an unusually smooth and slick road surface, such as oil-soaked asphalt, well-laid wood blocks or the like, and when such surfaces are wet, or wet and "slimy". Under such circumstances smooth or ineffectively designed non-skid tire treads are likely to precipitate sudden and dangerous skidding of the vehicle. The primary cause of such skidding is that an effective and unbroken liquid film is momentarily formed between road surface and the ineffective non-skid zone of the tire then in road contact and under such conditions the application of brakes results in a slide of the tire on the unbroken film which functions much the same as a good oil film functions on bearing surfaces.

In contrast with the skid tendency described, it has been demonstrated that a "sharp-cut" center traction design such as that type illustrated in Figure 1 will minimize or completely overcome skidding under identical conditions that prove disastrous to treads worn smooth or ineffectively designed. The reason for this lies in the ability of such a tread to cut through and break the liquid film and bring the clutching rubber edges of the tread configuration into intimate contact with the material of the road. Such a tread, due to the distortion and creeping of its independent elements in the zone of road contact, acts as an effective "squeegee" to wipe and squeeze the liquid film from the bearing areas of the elements into the channels serving to delineate the bearing areas of the composite design, from whence they escape without harmful effect.

Now, by reference to Figure 2 this invention affords a reliable means for testing the effectiveness of various tread designs under conditions accurately simulating skid-provoking road conditions as described. A perfectly smooth, plane test surface 16, preferably thick plate glass, is surrounded by water-sealing margins 17 and the surface is flooded with water, soap solution, or any other liquid media best adapted to emphasize the objects sought to be demonstrated. On this prepared surface the demonstrator manipulates the test block under varying pressures, speeds and changes of direction, first one prepared tread design then another, to experience the relative effectiveness of the respective foot-print areas to cut through the film and clutch without slippage.

In order that the comparative effectiveness of the various test block designs shall be consistent it is particularly pointed out that the material of the block 10 is conventional rubber tread stock; that such material is identical as to all duplicated tread designs incident thereto; and that the areas and contours of each such separate design are identical or substantially so. By this procedure we attain identity as between the several test block design faces of coefficient of friction, materials, contour of contact, and net bearing area. These factors, and the further fact that test block areas are duplicates of actual tire foot-prints, insure instructive and reliable comparative determinations.

It is understood that these sets of test blocks, or a single multi-face block, duplicate a single foot-print impression developed by one size of tire. This fact does not, however, affect the reliability of the results of a demonstration such as described, as applied to relative non-skid efficiency of the design so tested when related to that same design on other sizes of tires. This is so for the reason that the design when used on other sizes of tires still maintains its inherent properties and non-skid characteristics, and the general changes in contour and areas of the respective foot-prints under normal loading are in such related proportion as not to disturb the results.

Where tire foot-prints are referred to as reproduced on a test block, it is understood that the intent is that any resilient tire, solid, cushion or pneumatic, is contemplated within the scope of the invention. It is further understood that the test block reproduction of the foot-print tire design thereon appearing in a flattened plane need not express the distorted aspect of the tread design elements of the loaded tire foot-print, for the reason that subsequent test pressure on the block in demonstration will distort the elements of the design in proportion to pressure applied and the resulting performance will record comparative efficiency within permissible error.

Various modifications within the scope of this invention will readily suggest themselves to one skilled in the art. For instance, a test block may have but a single prepared face design; the grasps 13 may be omitted if the demonstrator prefers to exert direct hand pressure upon the body of the block; where a plurality of test designs are embodied on a multi-face block each such design may be separately produced on its individual slab or base and the separate elements may be suitably associated to form a multi-face block; the design on the test block is preferably a full-size tire foot-print of a small cross section standard tire, but it is obvious that the size of the test block design may be decreased or increased with reference to its original tire foot-print without affecting the accuracy of the relative results; also, the material used in the test block may be varied from the preferred example of rubber such as is conventional to tread stock.

Where "designs" are referred to on the test block, the term is used conventionally to designate tire tread designs generally, and, of course, implies the presence of the mechanics of the structure thereto pertaining.

Reserving fully the modifications and variations capable of being resorted to within the scope of my invention and as embraced within the appended claims, I claim:

1. A test block of resilient material having a face duplicating in area, contour and design the foot-print of a tire having a resilient tread under load.

2. A test block of resilient tire tread rubber having a test surface lying in a single plane and in duplication of area, contour and design of the foot print of a tire having a resilient tread under deflection.

WALTER J. LEE.